Sept. 6, 1932.  J. L. PERKINS ET AL  1,875,487

MANGLE OR WRINGER CONSTRUCTION

Filed Jan. 6, 1932

INVENTORS,
Julian L. Perkins and
Hiram D. Croft,
BY
ATTORNEY.

Patented Sept. 6, 1932

1,875,487

UNITED STATES PATENT OFFICE

JULIAN L. PERKINS, OF WEST SPRINGFIELD, AND HIRAM D. CROFT, OF SPRINGFIELD, MASSACHUSETTS, ASSIGNORS TO PERKINS MACHINE & GEAR COMPANY, OF WEST SPRINGFIELD, MASSACHUSETTS, A CORPORATION OF MASSACHUSETTS

MANGLE OR WRINGER CONSTRUCTION

Application filed January 6, 1932. Serial No. 584,920.

This invention relates to improvements in mangle or wringer construction and is directed more particularly to driving connections therefor.

The principal objects of the invention are directed to the provision of novel wringer head mechanism adapted for connecting a wringer roll or the like to a drive therefor. According to one feature of the invention the mechanism is simple in construction so as to be economical to manufacture and by reason of the novel combination and arrangement of parts the mechanism is efficient in its operation. The simplicity of the structure is accomplished by providing a one-piece unitary casing and other features contributing to the provision of a compact and relatively small assembly.

Numerous and various novel features and advantages of the invention will be hereinafter more fully referred to in connection with the accompanying description of the preferred form thereof which for purposes of disclosure is illustrated in the accompanying drawing, wherein.

Figure 1:
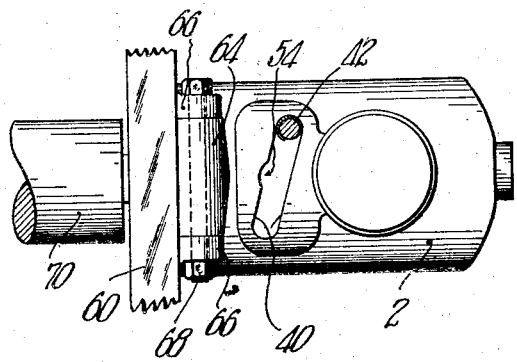
Fig. 1 is a plan view of a driving apparatus embodying the novel features of the invention.
Figure 2:
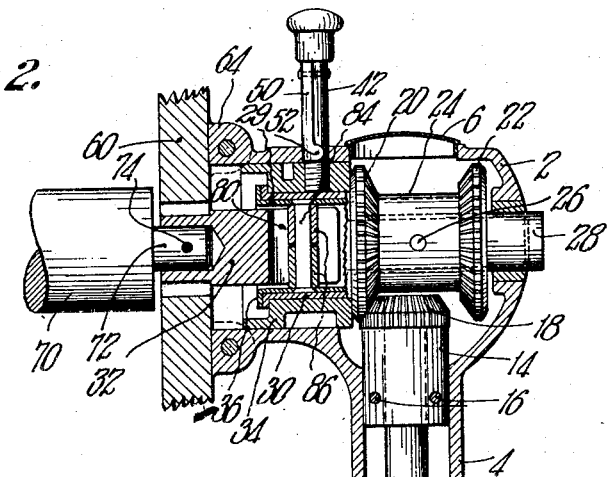
Fig. 2 is a longitudinal sectional view through the apparatus shown in Fig. 1.

Referring now to the drawing in detail the invention will be more fully described.

The mechanism is associated with a case or housing 2 which may have a depending hub or barrel portion 4 and a removable cover 6 at the upper side thereof. The hub 4 may be tubular to co-operate with a tube, sleeve or other supporting part of a washing machine with which the apparatus may be used, and a spring pressed locking bolt 8 is associated with the hub which may engage with notches or recesses in the part co-operating with the hub, so that the mechanism may be locked in various positions of angular adjustment with respect to the sleeve mentioned.

The housing according to the invention is a single unit for purposes of economy in manufacture and is to be distinguished from prior art housings which consist of secured together parts.

A drive shaft 10 is provided which carries a pin 12 or the like whereby the shaft may be connected to and driven from a suitable driving shaft or element. Preferably this shaft 10 is rotatable in a bearing member 14 which in the form of the invention shown may be fixed in the part 4 by means of a pin or pins 16, as shown.

A drive pinion 18 is fixed to the upper end of the shaft 12 for engaging with and rotating one or the other of a pair of driven gears 20 and 22. Accordingly as either of the gears 20 or 22 is brought into mesh with the gear 18 the said gears will be rotated in one direction or the other.

The gears 20 and 22 are held together in spaced relation by a sleeve 24 and may be either fixed to or non-rotatable on, a shaft 28 which, in the form of the invention shown, is tubular. The shaft 28 may be enlarged, as at 29 at the side of the gear 20, to provide a socket as shown. The enlarged part 29 of the shaft 28 is rotatable in a bearing 30 of a cam member 34, while the outer end of the said shaft 28 is rotatable in the housing, as shown.

The cam 34 is rotatable and reciprocable in the housing and may abut a side of the gear 20, while the part 29 of the shaft may have a flange 36 outside the cam.

It will be noted that the shaft at one end is journalled in the housing, while its other end is journalled in the cam, which in turn is journalled in the housing. Also it will be observed that the inner end of the shaft is provided with a socket within the cam. This makes it possible to adequately support the shaft for rotation and at the same time provide a structure which is relatively short from end to end. The latter feature is necessary if the desired economy in material and labor is to be effected and if an assembly of small size and moderate weight is to be provided.

A slot 40 and lever or stud 42 are associated with the housing and cam, the slot being disposed angularly so that as the cam is rotated it will be reciprocated for shifting the gears 20 and 22.

A spring member 50 is secured at its upper end to the lever 42 and has a lower end 52 which is adapted to yieldingly bear against a side of the slot 40. A notch 54 in a side of the slot 40 intermediate the ends thereof receives the lower end 52 of the spring 50 so as to yieldingly retain the lever in an intermediate or neutral position whereby neither of the gears 20 or 22 is in mesh engagement with the gear 18. This may be called an inoperable position of the lever 42.

The housing or case 2 may be attached to or have secured thereto a part indicated at 60 which may present a part of a wringer, such as the frame thereof or the like. In the form of the invention shown the housing has lugs 64 which are receivable between ears 66 carried by the member 60 and bolts 68 pass through the parts to hold them in secured together relation.

A wringer roll is shown at 70, a shaft 72 of which is secured by a pin 74 to a coupling 32. The coupling 32 may be mounted for rotation in the part 60 if desired or of course it may be suitably supported in any other convenient manner. The specific manner of supporting the roll or its shaft is not material for purposes of describing this invention. Suffice it to say that the coupling is receivable in the socket or hollow end 29 of the shaft 28.

The coupling 32 is provided with a slot 80 on its inner end which is open at the extreme right hand end thereof. A drive pin 84 is carried by the tubular shaft 29 and may have tubular or roller members 86 thereon which are receivable in the slot 80 of the coupling. As the shaft 28 rotates the coupling 32 is driven by means of the tubular members 86 and pin 84 which are disposed within the slot 80.

Preferably where the tubular members 86 are used they are free to rotate on the pin 84 so that the coupling may readily and easily receive the rollers and so the coupling floats in the socket of the shaft. Should there be a tendency for the coupling and shaft 28 to move axially during the rotation of the parts the rollers permit of this without disturbing the driving connections and without wear which would be usual in case the parts were fixed together against relative movements. At all times the shaft 28 may be moved to shift the gears without disturbing the driving connection.

As will be seen the shaft 28 is mounted for rotation in one end of the case while its other socket end is rotatable in a cam which is supported within the case. In this way the parts may align with one another without a binding tendency and the wringer roll is suitably connected to the shaft so that it is driven thereby in such a manner as to avoid undue friction. This is accounted for by the fact that the coupling and shaft are flexibly connected whereby the parts may if necessary move relative to one another without disturbing the driving connections or unnecessarily strain the parts as would be the case if the parts were rigidly fixed together and did not line up perfectly.

Figure 3:
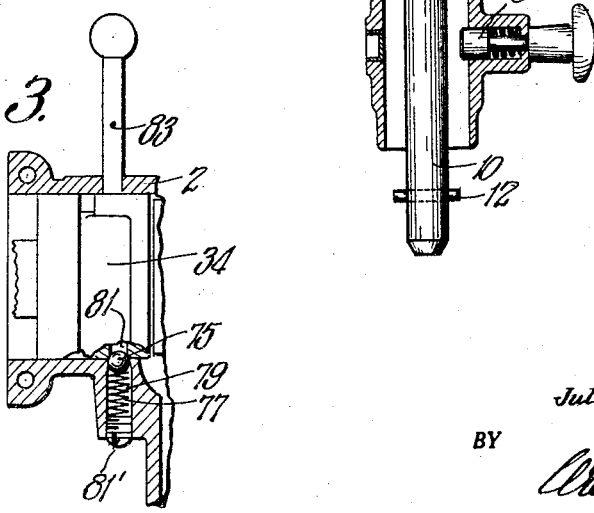
Fig. 3 is a fragmentary sectional view similar to Fig. 2 showing a modified form of the invention.

According to the modification of the invention shown in Fig. 3, the cam 34 is held in its neutral position by means now to be described. A lock member which may be in a form of a ball 75 is urged upwardly by means of a spring 77 in a bore 79 in the lower side of the case 2. The tension of the spring is controlled by an adjusting member in the form of a screw plug 81 and the cam 34 has a recess 83 in its lower side for receiving the ball. The recess is disposed so that the ball is forced thereinto when the cam is in a neutral position and a lever or handle 83 is provided as in the former case for imparting movement to the cam.

Altogether the mechanism of the invention is simple in form in that it comprises relatively few parts. It is efficient in its operation and is of such a character that it may be adapted for use in connection with washing machine apparatus in general where it is desired to operate a wringer or mangle from the washing machine drive. It is possible to modify or change the structure to adapt it for use in connection with various types of machines.

It will be noted that the shaft is journalled at one end in the housing while its other end which has a socket is journalled in a cam rotatable in the casing. This is important because the parts provide a structure of relatively short overall dimensions and one having relatively few parts so as to be simple in form and yet efficient in its operation. Also by reason of the simplicity and compactness the apparatus is readily adapted for use in connection with various types of washing machines.

Having described the invention in the form at present preferred, what we now desire to claim and secure by Letters Patent of the United States is:

1. An apparatus of the class described comprising in combination, a housing, a drive shaft rotatable therein carrying a driving element, a driven shaft having a rear end rotatable and reciprocable in the rear end of said housing, a cam oscillatable and reciprocable in said housing at the forward end thereof rotatably receiving the forward end of said driven shaft, a driven element fixed to said driven shaft between said cam member and the rear end of said housing, means associated with said driven shaft and cam to hold them against relative reciprocation and means associated with said cam as it is oscillated in said housing to move said driven shaft and bring said driven element into and out of engagement with the driving element.

2. An apparatus of the class described comprising in combination, a housing, a drive shaft rotatable therein carrying a driving element, a driven shaft having a rear end oscillatable and rotatable in the rear end of said housing, a cam oscillatable and reciprocable in said housing at the forward end thereof rotatably receiving the forward end of said driven shaft, a driven element fixed to said driven shaft between said cam member and the rear end of said housing, means associated with said shaft and cam to hold them against relative reciprocation and means associated with said cam and housing arranged to bring about reciprocation of said cam as it is oscillated in said housing to move the driven shaft and bring the driven element into and out of engagement with the driving element, the forward end of said shaft being provided with a socket to receive a shaft and a driving member extending thereacross for connecting to a shaft.

3. An apparatus of the class described comprising in combination, a housing having a driving element therein, a cam member reciprocable and oscillatable therein, a pin and slot connection associated with said cam and housing, the said slot being disposed at an angle relative to the axis of oscillation of said cam whereby the cam is reciprocated as it is oscillated, a driven shaft journalled at one end in said housing and at its opposite end in said cam, a pair of integral driven elements fixed on said shaft between its ends and means to prevent relative reciprocation of said cam and shaft whereby the latter is reciprocated by the former.

4. An apparatus of the class described comprising in combination, a housing having a drive gear therein, a cam oscillatable and reciprocable in said housing at one side of said gear, the said housing being provided with a slot angularly disposed receiving a pin secured to said cam whereby the cam is reciprocated as it is oscillated, a driven shaft having a forward end journalled in said cam and a rear end journalled in said housing at another side of said driving element, a pair of driven gears held in fixed spaced relation by a spacer member and secured to said driven shaft between the ends thereof, the said gear adjacent said cam abutting said cam at one side thereof and a flange associated with said driven shaft at the other side of said cam to hold said cam and shaft against relative reciprocating movements whereby said shaft is reciprocated by said cam as it is reciprocated by oscillatory movements thereof.

5. An apparatus of the class described comprising in combination, a housing having a drive gear therein, a cam oscillatable and reciprocable in said housing at one side of said gear, the said housing being provided with a slot angularly disposed receiving a pin secured to said cam whereby the cam is reciprocated as it is oscillated, a driven shaft having a forward end journalled in said cam and a rear end reciprocable and rotatable in said housing at another side of said driving element, a pair of driven gears on said driven shaft held in fixed spaced relation to a spacer member therebetween which member is fixed to said driven shaft between the ends of the shaft, the said driven gear adjacent said cam abutting said cam at one side thereof and a flange associated with said shaft at the other side of said cam to hold said cam and driven shaft against relative reciprocation whereby said shaft is reciprocated by said cam as it is reciprocated by oscillatory movements thereof, the end of said shaft in said cam being provided with a socket for receiving another shaft and a driving member for said other shaft in said socket.

In testimony whereof we affix our signatures.

JULIAN L. PERKINS.
HIRAM D. CROFT.